H. UIHLEIN.
METHOD OF UTILIZING SPENT FIRE GASES FROM A FURNACE FOR FIRING FURTHER FURNACES.
APPLICATION FILED NOV. 24, 1909.

964,341.

Patented July 12, 1910.

Witnesses:
Corinne Myers
Thomas Donnellan

Inventor
Hermann Uihlein
by L. K. Böhm,
Attorney.

ered charge of fresh gas retort carbon
UNITED STATES PATENT OFFICE.

HERMANN UIHLEIN, OF NUREMBERG, GERMANY.

METHOD OF UTILIZING SPENT FIRE-GASES FROM A FURNACE FOR FIRING FURTHER FURNACES.

964,341.   Specification of Letters Patent.   Patented July 12, 1910.

Application filed November 24, 1909. Serial No. 529,682.

*To all whom it may concern:*

Be it known that I, HERMANN UIHLEIN, a citizen of the Empire of Germany, residing at Nuremberg, in the Empire of Germany, have invented a new and useful Method of Utilizing Spent Fire-Gases from a Furnace for Firing Further Furnaces, of which the following is a specification.

Distilling furnaces used in the manufactures of coke and of lighting-gas are generally fired with gas produced in generators from gas retort carbon, which is obtained as a by-product from the gas retorts. The gasification of the gas retort carbon takes place at a temperature of from 800° to 900° centigrade, so that the generator-gas so formed has a temperature of about 850° centigrade on entering the distilling furnace where it is burned with air introduced into the same. The spent gases leaving the furnace contain about from 18 to 20% of carbonic acid and the unburnable constituents of the air used for the combustion and have a temperature of about 600° centigrade, while the gas retort carbon obtained from the gas retorts has a temperature of about 1250° centigrade and is as a rule for the most part extinguished.

It will be seen, that in the above process the quantities of heat contained in the spent fire gases and in the gas retort carbon are entirely lost.

My invention consists of a method of utilizing the temperature of glowing carbon of any kind at disposal and that of the spent fire gases from any furnace for firing further furnaces in the manner, that the spent fire gases from the first furnace are conducted over the glowing carbon charged into the generator of the following furnace, so that their carbonic acid is reduced to carbonic oxid by a small quantity of the glowing carbon while a further small quantity of the latter is oxidized to carbonic oxid, whereby the glowing carbon is slightly cooled. The so regenerated gas is passed through the second furnace, where it is burned with air supplied. This is continued until the glowing carbon has been cooled to about 800° centigrade, when it is discharged from the generator and is replaced by a fresh charge of glowing carbon. The spent fire gases from the second furnace are again utilized in a similar manner in the following furnaces.

I will now proceed to describe my invention with reference to the accompanying drawing, in which—

Figure 1:
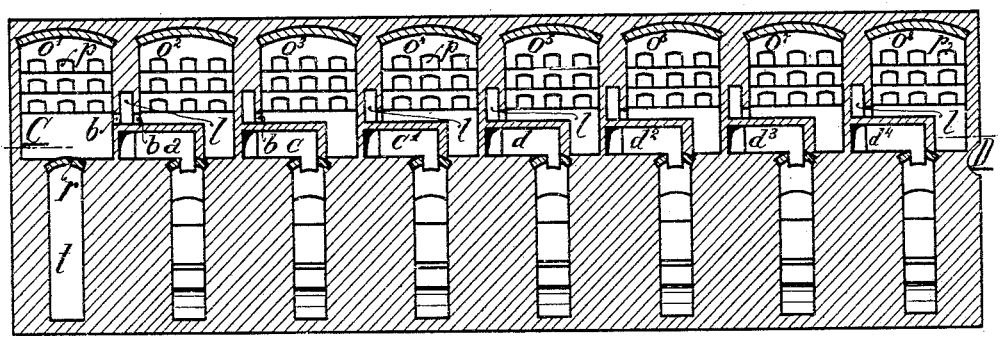
Figure 2:
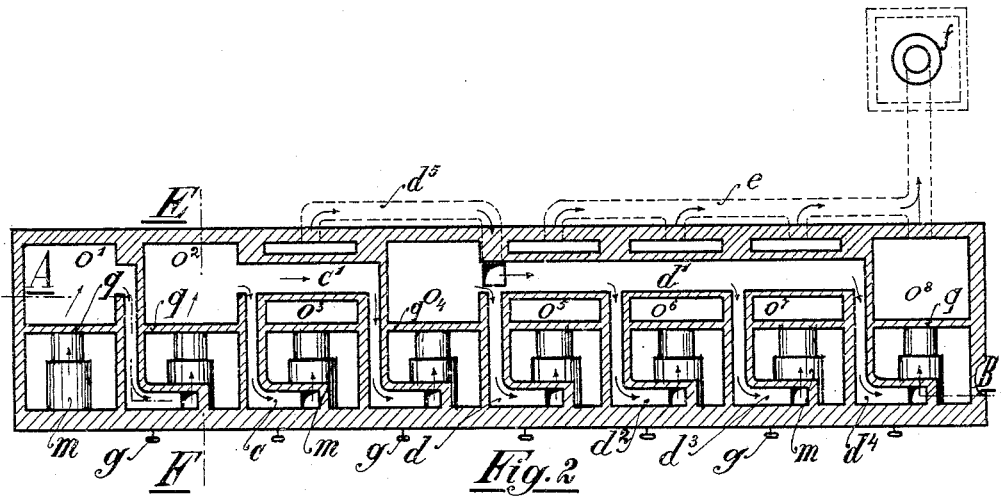
Figure 3:
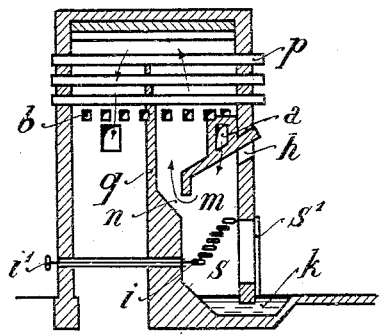

Figure 1 is a vertical section through a battery of distilling furnaces on the broken line A—B in Fig. 2, Fig. 2 is a horizontal section through the same and a chimney on the line C—D in Fig. 1, and Fig. 3 is a vertical section through the line E—F in Fig. 2, seen in the direction of the arrows.

Similar letters of reference refer to similar parts throughout the several views.

I have illustrated by way of example a battery of eight juxtaposed distilling furnaces $o^1$, $o^2$, .... $o^8$ with a common chimney $f$, which plant is suitable for the manufacture of lighting-gas. Each furnace contains several (here nine) horizontal gas retorts $p$ of any known construction, a generator $m$ and a partition $q$. The glowing gas retort carbon obtained from gas retorts is charged into the generator $m$ through a door $h$ of any known construction; the developed generator gas escapes through an opening $n$ and passes in the direction of the arrows first upward, then over the partition $q$ downward, while it burns with air conducted from without through a channel $l$ in the brickwork and entering the combustion chamber through openings $b$, so that the gas retorts $p$ are heated by the burning mixture.

In the first furnace $o^1$ the combustion chamber is at the rear closed by an arch $r$ or the like above the pit $t$ (Fig. 1) and is put in communication with the uppermost part of the generator $m$ in the second furnace $o^2$ by means of a bent channel $a$, as shown. In consequence of this the spent fire gases from the first furnace $o^1$ are conducted to the generator $m$ of the second furnace $o^2$, so that they pass over the glowing gas retort carbon, whereby their carbonic acid is by a small quantity of the latter reduced to carbonic oxid while their heat is increased and another small quantity of the glowing gas retort carbon is oxidized to carbonic oxid. The so regenerated gas enters through the opening $n$ the combustion chamber of the second furnace $o^2$ and burns with the air supplied through the channel $l$ and the openings $b$, so that the burning mixture can heat the gas retorts $p$. The combustion chamber is at the rear again closed to the chimney by an arch $r$ or the like, so that the spent fire gases are compelled to pass through a bent channel $c$ to the generator of the third furnace $o^3$.

The spent fire gases leaving the first furnace $o^2$ are approximately similar in physical and chemical regards to the gases developed in a generator during the first half of the process, so that in 100 parts by volume of spent fire gases there are about 20 parts by volume of carbonic acid and 80 parts by volume of nitrogen. During the reduction of the carbonic acid in the generator $m$ of the second furnace $o^2$, 20 further parts by volume of the gas retort carbon are bound, so that in one cubic meter of the regenerated gas there are contained one third of carbonic oxid and two thirds of nitrogen. This mixture according to its composition contains about 1100 calories per cubic meter.

From the above it follows, that when leaving out of account the initial heat required for the formation of gas in the generator the consumption of carbon amounts to approximately only half that in the ordinary generator, since the remainder is furnished by the carbonic acid of the spent fire gases; further that the consumption of gas for the production of the same heat is but about four fifths of that hitherto required, since the caloric value of the gas is the higher in the inverse proportion. By burning this generator gas again spent fire gases of the original composition are formed; for the complete combustion, that is when the correct quantity of air is supplied, one cubic meter generator gas will yield 1.66 cubic meters of spent fire gases, and this quantity is double that required for forming heating gas. Therefore the quantity of spent fire gases leaving any furnace of a given size can be utilized for the production of a quantity of generator gas sufficient for two other furnaces of the same size.

The above mentioned initial heat required for the production of generator gas is according to my method taken off the glowing gas retort carbon possessing an initial temperature of about 1250° centigrade, so that the gas retort carbon gradually cools, but its temperature is not permitted to sink beneath 800° centigrade. As practically a considerable excess of gas retort carbon is at disposal, on the one hand the losses of heat due to radiation can be easily compensated, and on the other hand the quality of the gas retort carbon is but slightly reduced by the insignificant extraction of carbon.

As according to the above explanations the spent fire gases leaving the second furnace will suffice for two further like furnaces, they are conducted partly through the channel $c$ to the generator $m$ of the third furnace $o^3$ as already mentioned above and partly through a separate bent channel $c^1$ (Fig. 2) to the generator $m$ of the fourth furnace $o^4$. In the two furnaces $o^3$ and $o^4$ the carbonic acid of the spent fire gases from the second furnace $o^2$ will be again reduced by the contact with the glowing gas retort carbon in the generators $m$ and the regenerated gases will burn with air supplied through openings $b$, so that the burning mixture can heat the gas retorts $p$. The spent fire gases now formed will suffice for four further like furnaces, and for this reason one fourth of them is conducted from a distributing channel $d^1$ (Fig. 2) through a channel $d$ to the generator $m$ of the furnace $o^5$, another fourth is conducted through a channel $d^2$ to the generator $m$ of the furnace $o^6$, a third fourth is conducted through a channel $d^3$ to the generator $m$ of the furnace $o^7$, and the last fourth is conducted through a channel $d^4$ to the generator $m$ of the furnace $o^8$, the spent fire gases from the two furnaces $o^3$ and $o^4$ being conducted partly through a separate channel $d^5$ and partly direct to the distributing channel $d^1$. In the four last furnaces $o^5$, $o^6$, $o^7$ and $o^8$ the combustion chamber is at the rear not closed by an arch like $r$ but communicates through the pit $t$ and an opening with a collecting channel $e$, so that the spent fire gases from all these four furnaces can escape through the channel $e$ and the chimney $f$.

It depends upon the draft of the chimney, how many distilling furnaces the battery may comprise. The regulation of the draft is effected by slides $g$ for the purpose of uniformly distributing the spent fire gases from the two furnaces $o^3$ and $o^4$ over the four furnaces $o^5$, $o^6$, $o^7$ and $o^8$.

As the gas retort carbon in the several generators $m$ is cooled from 1250° centigrade to about 800° centigrade, it is evident that the difference of 450° centigrade is recovered for heating the gas retorts $p$. The gas retort carbon cooled to 800° centigrade in any of the generators $m$ is discharged from the latter by withdrawing a slide $i$ by means of a handle $i^1$ and is allowed to drop into the pit $s$ provided with a water seal $k$. It is removed through the door $s^1$ in the usual manner, after the generator $m$ has been recharged with glowing gas retort carbon from the gas retorts.

Evidently the heat of the spent fire gases does not get lost during their passage through the whole battery. Only the heat contained in the spent fire gases escaping through the chimney will get lost, but this is unavoidable. At any rate, the total loss of heat will be considerably reduced with my method, while the useful effect of the plant is considerably increased.

I desire it expressly to be understood, that I do not limit myself to the construction of the battery of distilling furnaces shown and described for the manufacture of lighting-gas, but reserve to myself the right of constructing the battery in any known manner, while the essential features pointed out are maintained.

It is obvious, that my method can also be applied with the same advantage to furnaces of any other known construction, which are disposed in groups in plants where glowing carbon of any description is at disposal for reducing the carbonic acid of the spent fire gases from the furnaces.

I am aware, that it is already known, to reintroduce the spent fire gases from a furnace into the generator for the purpose of reducing their carbonic acid, but my new method differs from this process in that any glowing carbon obtained by some process is utilized for the reduction of the carbonic acid of the spent fire gases, while the glowing carbon is gradually cooled to a determined limit, after which it is replaced by a fresh charge of glowing carbon.

I claim:

1. The method of utilizing spent fire gases from a furnace for firing further furnaces, which consists in passing the spent fire gases from any furnace over glowing carbon of any kind at disposal charged into generators beneath following furnaces, so as to reduce their carbonic acid to carbonic oxid and to oxidize small quantities of the glowing carbon to carbonic oxid, in burning the regenerated gases with air for heating the respective furnaces, and repeating the process with the spent fire gases so formed in the then following furnaces until the spent fire gases from the last furnaces are allowed to escape through a chimney, care being taken, that the temperature of the glowing carbon does not sink beneath a determined limit, at which moment it is replaced by a fresh charge of glowing carbon.

2. The method of firing a battery of like furnaces possessing generators, which consists in passing the spent fire gases from the first furnace over glowing carbon of any kind charged into the generator of the second furnace, so as to reduce the carbonic acid of the spent gases to carbonic oxid and to oxidize small quantities of the glowing carbon to carbonic oxid, in burning the regenerated gases with air for heating the respective parts of the furnace, in passing the spent fire gases so formed to the generators of following furnaces and repeating the process, the number of the following furnaces being double that of the preceding furnaces, until the spent fire gases from the last group of furnaces are allowed to escape through a chimney, care being taken that the temperature of the glowing carbon does not sink beneath a determined limit, at which moment it is replaced by a fresh charge of glowing carbon.

3. The method of utilizing spent fire gases from a distilling furnace for firing further distilling furnaces, which consists in passing the spent fire gases from any furnace over glowing gas retort carbon charged into generators beneath following furnaces, so as to reduce their carbonic acid to carbonic oxid and to oxidize small quantities of the glowing carbon to carbonic oxid, in burning the regenerated gases with air for heating the respective distilling vessels, and repeating the process with the spent fire gases so formed in the then following furnaces until the spent fire gases from the last furnaces are allowed to escape through a chimney, care being taken, that the temperature of the glowing carbon does not sink beneath a determined limit, at which moment it is replaced by a fresh charge of glowing retort carbon.

4. The method of firing a battery of like distilling furnaces possessing generators, which consists in passing the spent fire gases from the first furnace over glowing gas retort carbon charged into the generator of the second furnace, so as to reduce the carbonic acid of the spent gases to carbonic oxid and to oxidize small quantities of the glowing carbon to carbonic oxid, in burning the regenerated gases with air for heating the respective distilling vessels, in passing the spent fire gases so formed to the generators of following furnaces and repeating the process, the number of the following furnaces being double that of the preceding furnaces, until the spent fire gases from the last group of furnaces are allowed to escape through a chimney, care being taken that the temperature of the glowing carbon does not sink beneath a determined limit, at which moment it is replaced by a fresh charge of glowing gas retort carbon.

HERMANN UIHLEIN.

Witnesses:
 OSCAR BOCK,
 BERNHARD REINHARDT.